(12) United States Patent
Hsiao

(10) Patent No.: US 8,011,087 B2
(45) Date of Patent: Sep. 6, 2011

(54) METHOD FOR ASSEMBLING LENS MODULE WITH IMAGE SENSOR

(75) Inventor: Bor-Yuan Hsiao, Taipei Hsien (TW)

(73) Assignee: Hon Hai Precision Industry Co., Ltd., Tu-Cheng, New Taipei (TW)

(*) Notice: Subject to any disclaimer, the term of this patent is extended or adjusted under 35 U.S.C. 154(b) by 584 days.

(21) Appl. No.: 12/182,362

(22) Filed: Jul. 30, 2008

(65) Prior Publication Data
US 2009/0183365 A1    Jul. 23, 2009

(30) Foreign Application Priority Data
Jan. 21, 2008  (CN) .......................... 2008 1 0300172

(51) Int. Cl.
H05K 3/30 (2006.01)
G02B 7/00 (2006.01)

(52) U.S. Cl. .......................................... 29/832; 29/834

(58) Field of Classification Search .................. 29/593, 29/830–836, 407.01–407.1, 592.1–887; 438/14–18, 438/48–98
See application file for complete search history.

(56) References Cited

U.S. PATENT DOCUMENTS

| | | | | |
|---|---|---|---|---|
| 5,528,357 A * | 6/1996 | Davis | ................ | 356/124 |
| 6,486,942 B1 * | 11/2002 | Colbourne et al. | ................ | 356/124 |
| 6,526,653 B1 * | 3/2003 | Glenn et al. | ................ | 29/830 |
| 7,404,248 B2 * | 7/2008 | Misawa et al. | ................ | 29/595 |
| 7,587,803 B2 * | 9/2009 | Montfort et al. | ................ | 29/407.1 |
| 7,656,513 B2 * | 2/2010 | Lei | ................ | 356/127 |
| 7,676,901 B2 * | 3/2010 | Misawa et al. | ................ | 29/595 |
| 7,707,712 B2 * | 5/2010 | Kim | ................ | 29/832 |
| 7,907,267 B2 * | 3/2011 | Spalding | ................ | 356/228 |
| 2007/0183773 A1 * | 8/2007 | Aoki et al. | ................ | 396/529 |
| 2008/0204728 A1 * | 8/2008 | Yen | ................ | 356/127 |
| 2008/0303939 A1 * | 12/2008 | Hsu et al. | ................ | 348/374 |
| 2008/0316470 A1 * | 12/2008 | Lei | ................ | 356/127 |
| 2009/0128684 A1 * | 5/2009 | Apel | ................ | 348/360 |
| 2009/0279270 A1 * | 11/2009 | Lee et al. | ................ | 361/758 |
| 2010/0025793 A1 * | 2/2010 | Chang et al. | ................ | 257/433 |
| 2010/0236063 A1 * | 9/2010 | Inagaki et al. | ................ | 29/832 |

* cited by examiner

Primary Examiner — Derris H Banks
Assistant Examiner — Kaying Kue
(74) Attorney, Agent, or Firm — Altis Law Group, Inc.

(57) ABSTRACT

A method for assembling a lens module with an image sensor, includes providing a holder having first and second receiving spaces, disposing the image sensor in the second receiving space, locating lens barrel at a first position in the first receiving space, casting a light beam on the lens module to allow the lens module to converge the light beam into a light spot on the image sensor, determining if the light spot is at its smallest to determine if a distance between the lens module at the first position and the image sensor is equal to a focal length of the lens module, moving the lens module to a second position in the first receiving space to achieve a predetermined distance from the first position, and positioning the lens module at the second position.

7 Claims, 4 Drawing Sheets

METHOD FOR ASSEMBLING LENS MODULE WITH IMAGE SENSOR

BACKGROUND

1. Technical Field

The present invention relates to a method for assembling a lens module with an image sensor.

2. Description of Related Art

Lens modules and image sensors are main components of digital camera modules. In some electronic devices that utilize digital camera modules, the lens modules and image sensors are fixed.

How a lens module is assembled with an image sensor and the results achieved are critical for determining the camera performance of the electronic device. A desirable distance between the lens module and the image sensor, and proper alignment are important considerations to camera performance.

However, it is difficult to identify an optical central axis and an optical center of the lens module based on the position and orientation of the lenses. Likewise, it is difficult to check whether a distance between the lens module and the image sensor is equal to a desirable distance, and whether the lens module and the image sensor are center-aligned with each other.

What is needed, therefore, is a method for assembling a lens module with an image sensor which is time-efficient and can achieve a high precision.

SUMMARY

The lens module includes a lens barrel and at least one lens received in the lens barrel. The method includes: providing a holder having a first receiving space for receiving the lens barrel and a second receiving space for receiving the image sensor; disposing the image sensor in the second receiving space of the holder; disposing the lens barrel at a first position in the first receiving space of the holder; casting a light beam on the lens module to allow the lens module to converge the light beam into a light spot on the image sensor; determining if the light spot is at its smallest to determine if a distance between the lens module at the first position and the image sensor is equal to a focal length of the lens module; moving the lens module to a second position in the first receiving space of the holder to achieve a predetermined distance from the first position; and positioning the lens module at the second position.

Other advantages and novel features of the present method will become more apparent from the following detailed description of embodiment when taken in conjunction with the accompanying drawings.

BRIEF DESCRIPTION OF THE DRAWINGS

Many aspects of the method can be better understood with reference to the following drawings. The components in the drawings are not necessarily drawn to scale, the emphasis instead being placed upon clearly illustrating the principles of the present method. Moreover, in the drawings, like reference numerals designate corresponding parts throughout the several views.

DETAILED DESCRIPTION OF THE EMBODIMENTS

Embodiment of the present method will now be described in detail below and with reference to the drawings.

Figure 1:
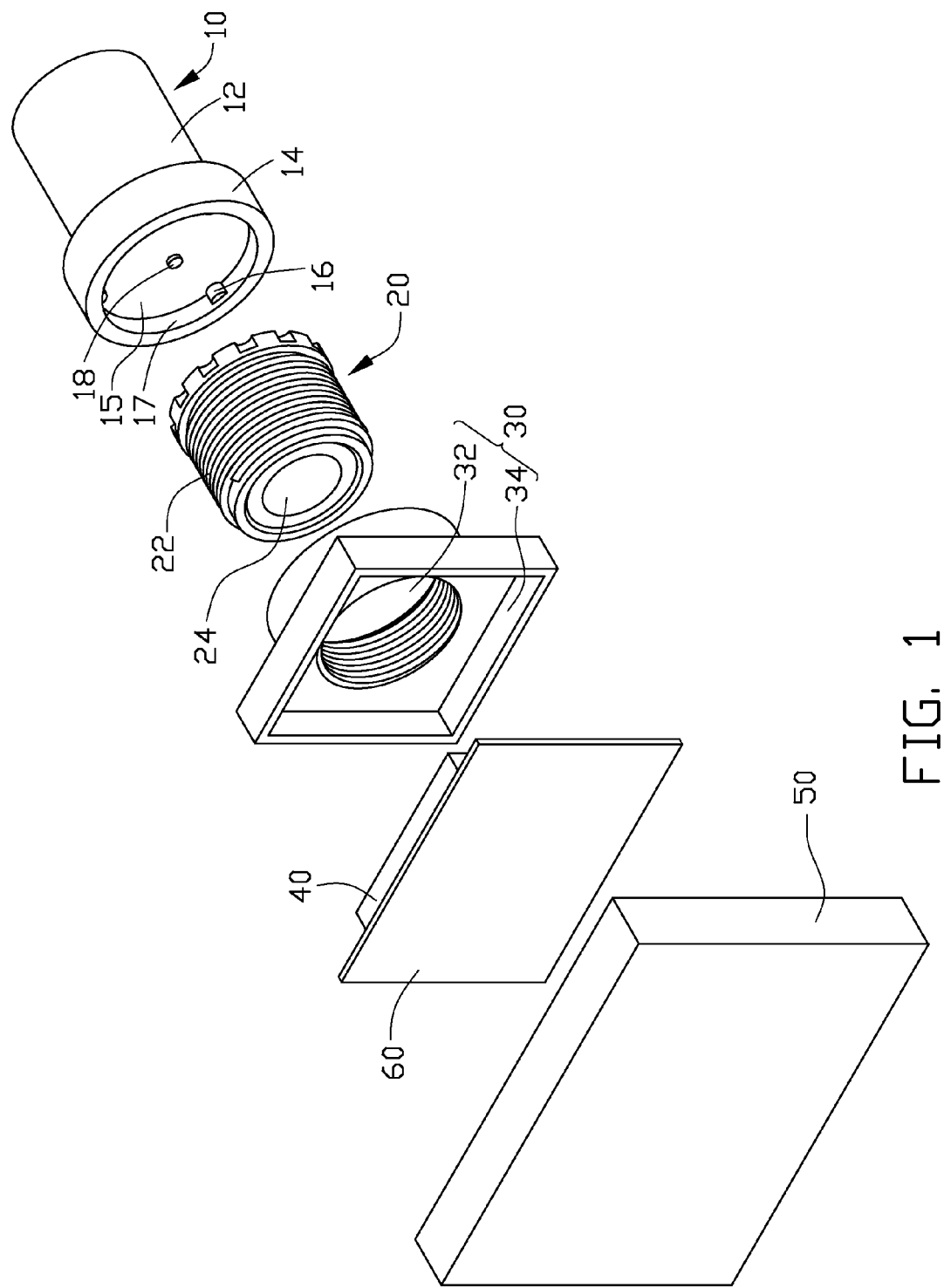
FIG. 1 is a schematic view of a clamp, a lens module, a holder, an image sensor, and a tray.

Referring to FIG. 1, an embodiment of the method for assembling a lens module 20 with an image sensor 40 is shown with the components such as a clamp 10, a holder 30, and a tray 50.

The lens module 20 includes a lens barrel 22 and a number of lenses 24 received in the lens barrel 22. The lens barrel 22 has outer threads formed in an outer wall thereof. The image sensor 40 can be selected from a charge coupled device (CCD) and a complementary metal oxide semiconductor transistor (CMOS). The image sensor 40 can be mounted on a printed circuit board 60.

The clamp 10 includes a grip 12, a ring-shaped clamping cap 14 oriented at an end of the grip 12, and a light source 18. The clamping cap 14 has a flat bottom surface 15 and an inner peripheral side surface 17. The light source 18 is arranged at a center of the bottom surface 15. Three spaced protrusions 16 are defined on the bottom surface 15 and adjacent to the inner peripheral side surface 17. The clamping cap 14 can receive and clamp an end of the lens barrel 22. The three spaced protrusions 16 are configured for contacting with an outer wall (not labeled) of the lens barrel 22.

The holder 30 has a cylindrical first receiving space 32 configured for receiving the lens module 20, and a rectangular second receiving space 34 configured for receiving the image sensor 40. The holder 30 has inner threads (not labeled) formed in an inner wall of the first receiving space 32.

The tray 50 is used to carry the holder 30, the image sensor 40 and the printed circuit board 60 during assembly of the lens module 20 into the holder 30.

Figure 2:
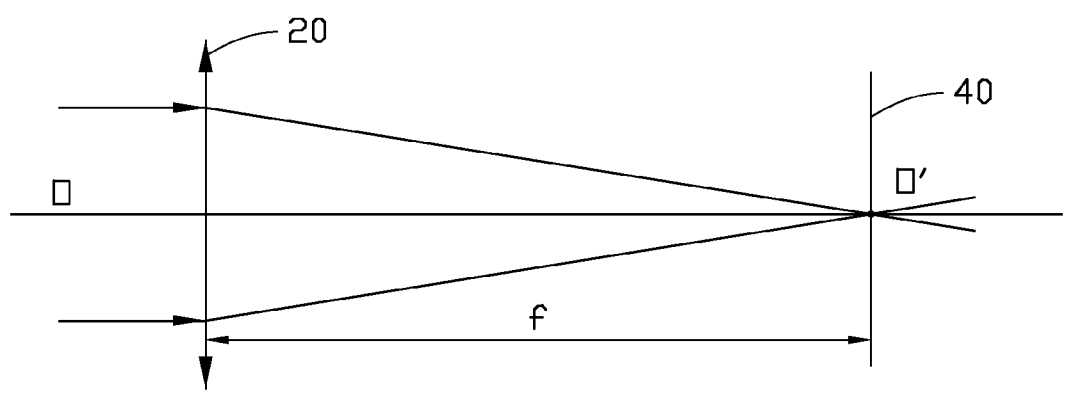
FIG. 2 is a diagram of a light path showing a distance between the lens module and the image sensor is equal to a focal length of the lens module.
Figure 3:
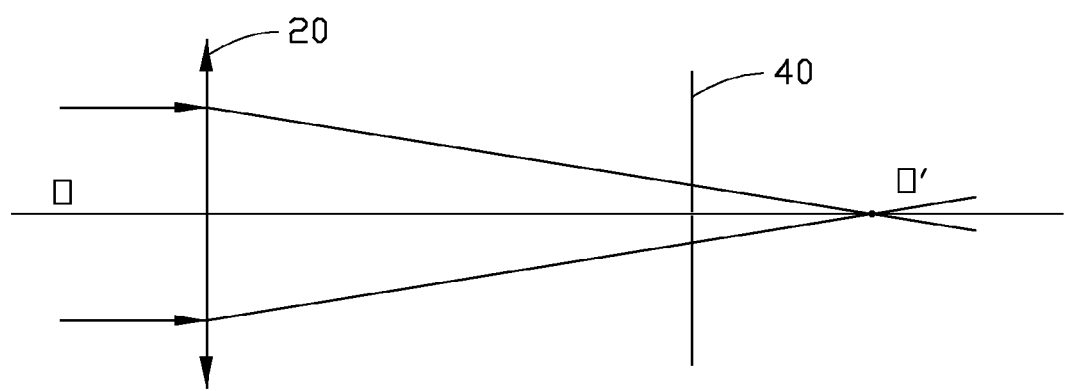
FIG. 3 is a diagram of a light path showing a distance between the lens module and the image sensor is smaller than a focal length of the lens module.
Figure 4:
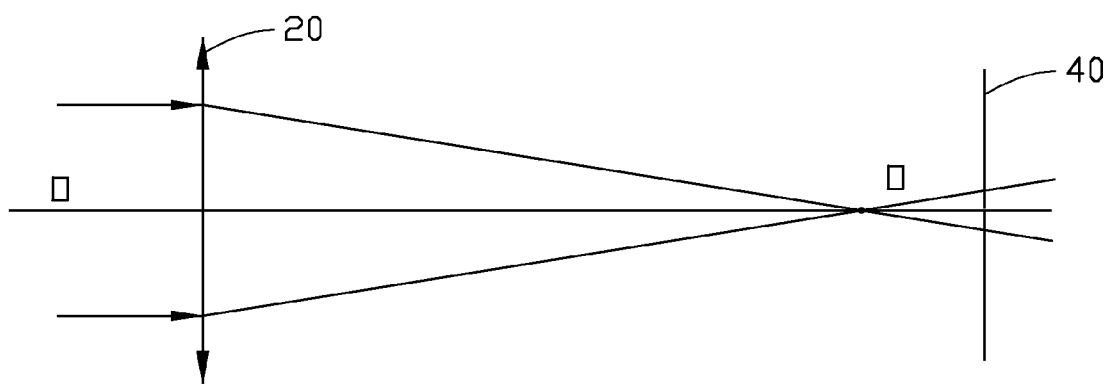
FIG. 4 is a diagram of a light path showing a distance between the lens module and the image sensor is larger than a focal length of the lens module.

One embodiment of a method for assembling the lens module 20 with the image sensor 40, includes, in no particular order:

disposing the image sensor 40 in the second receiving space 34;

placing the image sensor 40, the printed circuit board 60, and the holder 30 on the tray 50;

clamping the lens barrel 22 to the inner peripheral side surface 17 using the clamping cap 14 and the protrusions 16 when the lens barrel is abutted against the bottom surface 15;

locating the lens barrel 22 to a first position in the first receiving space 32; casting a light beam on the lens module 20 using the light source 18 to allow the lens module 20 to converge the light beam into a light spot (not shown) on the image sensor 40;

determining if the light spot is oriented on a center of the image sensor 40;

positioning the image sensor 40 in the second receiving space 34 until the light spot is oriented on the center of the image sensor 40;

determining if the light spot is at its smallest to determine if a distance between the lens module 20 at the first position and the image sensor 40 is equal to a focal length of the lens module (see FIGS. 2 to 4);

moving the lens module 20 to a second position in the first receiving space 32 of the holder 30 to achieve a predetermined distance from the first position;

positioning the lens module 20 at the second position.

In this embodiment, a light source 18 arranged on the clamp 10 and the light beam emitted from the light source 18 can help to precisely locate a focus position of the lens module 20 and adjust the position of the lens module to a desirable distance from the image sensor 40. In addition, the light beam emitted from the light source 18 can also help to determine if the image sensor 40 is center-aligned with the lens module 20.

It is understood that the above-described embodiments are intended to illustrate rather than limit the invention. Variations may be made to the embodiments and methods without departing from the spirit of the invention. Accordingly, it is appropriate that the appended claims be construed broadly and in a manner consistent with the scope of the invention.

What is claimed is:

1. A method for assembling a lens module with an image sensor, the lens module comprising a lens barrel and at least one lens received in the lens barrel, the method comprising:

providing a holder comprising a first receiving space for receiving the lens barrel and a second receiving space for receiving the image sensor;

disposing the image sensor in the second receiving space;

locating the lens barrel at a first position in the first receiving space;

providing a clamp having a light source for generating a light beam;

casting the light beam on the lens module to allow the lens module to converge the light beam into a light spot on the image sensor;

determining if the light spot is at its smallest to determine if a distance between the lens module at the first position and the image sensor is equal to a focal length of the lens module;

moving the lens module to a second position in the first receiving space of the holder to achieve a predetermined distance from the first position; and positioning the lens module at the second position.

2. The method of claim 1, wherein the lens barrel comprises outer threads formed in an outer wall, the holder further comprises inner threads formed in an inner wall of the first receiving space, and the lens barrel is threadedly engaged with the holder.

3. The method of claim 1, wherein the clamp further comprises a grip and a ring-shaped clamping cap formed at an end of the grip and configured for clamping the lens barrel, and the light source is arranged at a center of a bottom surface of the clamping cap.

4. The method of claim 3, wherein at least three spaced protrusions are defined adjacent to an inner peripheral side wall of the clamping cap for contacting with the lens barrel.

5. The method of claim 3, further comprising determining if the light spot is oriented on a center of the image sensor occurs before determining if the light spot is at its smallest on the image sensor.

6. The method of claim 5, wherein the image sensor is moved until the light spot is oriented on the center of the image sensor.

7. The method of claim 1, wherein the image sensor is mounted on a printed circuit board.

\* \* \* \* \*